(12) United States Patent
Maeda et al.

(10) Patent No.: US 9,825,314 B2
(45) Date of Patent: Nov. 21, 2017

(54) FUEL CELL AND MANUFACTURING METHOD OF EXPANDED METAL

(75) Inventors: Atsushi Maeda, Toyota (JP); Kazumi Sugita, Toyota (JP); Atsushi Ida, Nisshin (JP); Shingo Morikawa, Nagoya (JP); Keiji Hashimoto, Nagakute (JP); Satoshi Futami, Toyota (JP)

(73) Assignees: TOYOTA JIDOSHA KABUSHIKI KAISHA, Toyota-shi (JP); TOYOTA SHATAI KABUSHIKI KAISHA, Kariya-shi (JP)

( * ) Notice: Subject to any disclaimer, the term of this patent is extended or adjusted under 35 U.S.C. 154(b) by 508 days.

(21) Appl. No.: 14/112,394

(22) PCT Filed: Apr. 18, 2012

(86) PCT No.: PCT/IB2012/000767
§ 371 (c)(1),
(2), (4) Date: Oct. 17, 2013

(87) PCT Pub. No.: WO2012/143781
PCT Pub. Date: Oct. 26, 2012

(65) Prior Publication Data
US 2014/0162175 A1    Jun. 12, 2014

(30) Foreign Application Priority Data
Apr. 20, 2011    (JP) .................. 2011-093651

(51) Int. Cl.
*H01M 8/04082*    (2016.01)
*H01M 8/241*    (2016.01)
(Continued)

(52) U.S. Cl.
CPC ........ *H01M 8/04201* (2013.01); *B21D 31/04* (2013.01); *H01M 8/0232* (2013.01);
(Continued)

(58) Field of Classification Search
CPC .................................................. H01M 8/0258
See application file for complete search history.

(56) References Cited

U.S. PATENT DOCUMENTS

2006/0204806 A1    9/2006  Takada et al.
2010/0285395 A1*  11/2010  Hayashi ............... H01M 8/0232
                                                                  429/513
2011/0183238 A1*   7/2011  Kimura ............... H01M 8/0243
                                                                  429/529

FOREIGN PATENT DOCUMENTS

JP    2006-253038 A    9/2006
JP    2008-243572 A    10/2008
(Continued)

*Primary Examiner* — Ula C Ruddock
*Assistant Examiner* — Gregory Passa
(74) *Attorney, Agent, or Firm* — Andrews Kurth Kenyon LLP

(57) ABSTRACT

A cathode-side gas flow path of a cell that forms part of a fuel cell is formed by a first expanded metal arranged on a gas inlet side, and a second expanded metal arranged on a downstream side. The first expanded metal is such that mesh is arranged in a straight line, and gas that flows on a gas diffusion layer side is separated from gas that flows on a separator side. The gas flowrate on the gas inlet side is reduced, so the amount of produced water that is carried away is reduced. As a result, the gas inlet side is inhibited from becoming dry at high temperatures.

11 Claims, 8 Drawing Sheets

(51) Int. Cl.
*H01M 8/2483* (2016.01)
*H01M 8/0232* (2016.01)
*H01M 8/0254* (2016.01)
*H01M 8/0258* (2016.01)
*H01M 8/04291* (2016.01)
*B21D 31/04* (2006.01)
*H01M 8/1007* (2016.01)
*H01M 8/1018* (2016.01)

(52) U.S. Cl.
CPC ....... *H01M 8/0254* (2013.01); *H01M 8/0258* (2013.01); *H01M 8/04291* (2013.01); *H01M 8/1007* (2016.02); *H01M 8/241* (2013.01); *H01M 8/2483* (2016.02); *H01M 2008/1095* (2013.01); *Y02P 70/56* (2015.11); *Y10T 29/18* (2015.01)

(56) References Cited

FOREIGN PATENT DOCUMENTS

| | | |
|---|---|---|
| JP | 2009-026476 A | 2/2009 |
| JP | 2010-170984 A | 8/2010 |

* cited by examiner

OSCILLATING AMOUNT (Yw)

FUEL CELL AND MANUFACTURING METHOD OF EXPANDED METAL

CROSS REFERENCE TO RELATED APPLICATION

This is a national phase application based on the PCT International Patent Application No. PCT/IB2012/000767 filed on Apr. 18, 2012, claiming priority to Japanese application No. 2011-093651 filed Apr. 20, 2011, the entire contents of both of which are incorporated herein by reference.

BACKGROUND OF THE INVENTION

1. Field of the Invention

The invention relates to a fuel cell, and more particularly, to a gas flow path structure of a fuel cell. The invention also relates to a manufacturing method of expanded metal used in the fuel cell.

2. Description of Related Art

A fuel cell is formed as a stacked structure in which a plurality of single cells are stacked together, and a plate-shaped separator is used as a member that is positioned on the outermost layer of each cell and separates the cells from each other in the stack. The separator functions to supply a fuel gas to an anode side and supply an oxidizing agent to a cathode side, as well as functions to discharge produced water generated inside the cell.

Each cell of a polymer electrolyte fuel cell is a structure in which a gas diffusion layer, a gas flow path, and a separator are each arranged on both sides of a membrane electrode assembly (MEA). Each cell, in which the gas flow path forms a different structure than the separator, has expanded metal as the structure that forms the gas flow path.

The expanded metal is a continuous structure in which hexagonal mesh is arranged staggered. The mesh is arranged so as to form a sloped surface between the gas diffusion layer and the separator, such that gas flow paths are alternately arranged between the staggered mesh and the gas diffusion layer surface and between the staggered mesh and the separator surface. With the expanded metal, mesh is formed by making slits one strand at a time in a flat plate member using a mold while the flat plate member is advanced.

Japanese Patent Application Publication No. 2010-170984 (JP 2010-170984 A) describes a structure in which, in order to reduce gas pressure loss in a gas flow path of a cell, a bond portion that joins expanded metal mesh rises at a position where the bond length is partially reduced and forms part of a strand portion. Also, in an expanded metal manufacturing apparatus, the rising portion is appropriately formed by changing the number of continuations when continuously feeding material in an upper blade direction, i.e., a direction perpendicular to the feeding direction of the material, for each suitable location or region of the expanded metal, by changing shift control logic in the upper blade direction.

With expanded metal in which the mesh is arranged staggered, the gas flow path is arranged between the gas diffusion layer surface and the separator surface, so gas exchange between gas flowing on the gas diffusion layer side and gas flowing on the separator side is possible.

However, near the inlet of oxidizing gas such as air on the cathode side, oxygen has not yet been consumed. Therefore, there is a relatively large amount of gas so the amount of produced water that is carried away is large, and as a result, the area near oxidizing gas inlet tends to become dry. In particular, there is a significant tendency for the area near oxidizing gas inlet to become dry when supplying oxidizing gas such as air in a non-humidified state. Therefore, at high temperatures, the electric power generating performance on the oxidizing gas inlet side decreases and electric power generation becomes concentrated at the gas outlet side, such that the distribution of electric power generation in the electric power generating surface becomes uneven.

It is possible to suppress the evaporation of produced water from the gas diffusion layer by increasing the contact rate or contact area between the expanded metal and the gas diffusion layer. However, although this would enable the electric power generation capability to be maintained at high temperatures, the output voltage may end up decreasing at normal temperatures as a result of an increase in concentration overpotential due to lack of oxygen.

SUMMARY OF THE INVENTION

The invention thus provides a fuel cell capable of both suppressing a decrease in output due to drying at a gas inlet, and ensuring the necessary output voltage both at normal temperatures and at high temperatures. The invention also provides a manufacturing method of expanded metal used in this fuel cell.

A first aspect of the invention is related to a fuel cell that includes a gas diffusion layer, a separator, and an oxidizing gas flow path that is arranged between the gas diffusion layer and the separator and that is formed from expanded metal. The expanded metal includes an upstream first expanded metal that does not communicate oxidizing gas that flows on the gas diffusion layer side with oxidizing gas that flows on the separator side, and a downstream second expanded metal that has an opening that communicates oxidizing gas that flows on the gas diffusion layer side with oxidizing gas that flows on the separator side.

A second aspect of the invention is related to a fuel cell that includes a gas diffusion layer, a separator, and an oxidizing gas flow path that is arranged between the gas diffusion layer and the separator and that is formed from expanded metal. The expanded metal includes an upstream first expanded metal that has a first opening that communicates oxidizing gas that flows on the gas diffusion layer side with oxidizing gas that flows on the separator side, and a downstream second expanded metal that has a second opening that is larger than the first opening and that communicates oxidizing gas that flows on the gas diffusion layer side with oxidizing gas that flows on the separator side.

In the first and second aspects, a ratio of the first expanded metal to the oxidizing gas flow path may not be less than 1/3 and may not be more than 1/2.

In the first and second aspects, the ratio of the first expanded metal to the oxidizing gas flow path may be substantially 0.3.

In the first and second aspects, the fuel cell may further include: a cathode manifold that supplies oxidizing gas to the oxidizing gas flow path; and a gas diffusion member that is arranged between the cathode manifold and the first expanded metal, that diffuses oxidizing gas from the cathode manifold, and that causes the diffused oxidizing gas to flow into the first expanded metal.

In the first and second aspects, the gas diffusion member may be formed from expanded metal that is similar to the second expanded metal.

In the first and second aspects, the gas diffusion member may be formed by arranging the second expanded metal between the first expanded metal and the cathode manifold.

In the second aspect, the first expanded metal may be expanded metal in which adjacent meshes are arranged in a straight line; and the second expanded metal may be expanded metal in which adjacent meshes are alternately arranged.

A third aspect of the invention is related to a fuel cell that includes a gas diffusion layer, a separator, and an oxidizing gas flow path that is arranged between the gas diffusion layer and the separator and that is formed from expanded metal. The expanded metal is formed such that, on an upstream side, adjacent meshes are arranged in a straight line by shearing without oscillating a shearing blade in a direction perpendicular to a feeding direction of a flat plate, and on a downstream side, adjacent meshes are alternately arranged by shearing oscillating the shearing blade in the direction perpendicular to the feeding direction.

In the third aspect, the downstream side may be formed such that adjacent meshes are alternately arranged by fixing the position of an upper blade, making consecutive slits for two strands, then oscillating the upper blade in the direction perpendicular to the feeding direction and again making consecutive slits for two strands.

The invention makes it possible to suppress a decrease in output due to drying at a gas inlet, and ensure the necessary output voltage both at normal temperatures and at high temperatures.

A fourth aspect of the invention is related to a manufacturing method of expanded metal that forms an oxidizing gas flow path that is arranged between a gas diffusion layer and a separator that form a fuel cell. The manufacturing method includes: arranging, on an upstream side, adjacent meshes in a straight line by shearing without oscillating a shearing blade in a direction perpendicular to a feeding direction of a flat plate; and arranging, on a downstream side, adjacent meshes alternately by shearing oscillating the shearing blade in the direction perpendicular to the feeding direction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1A:
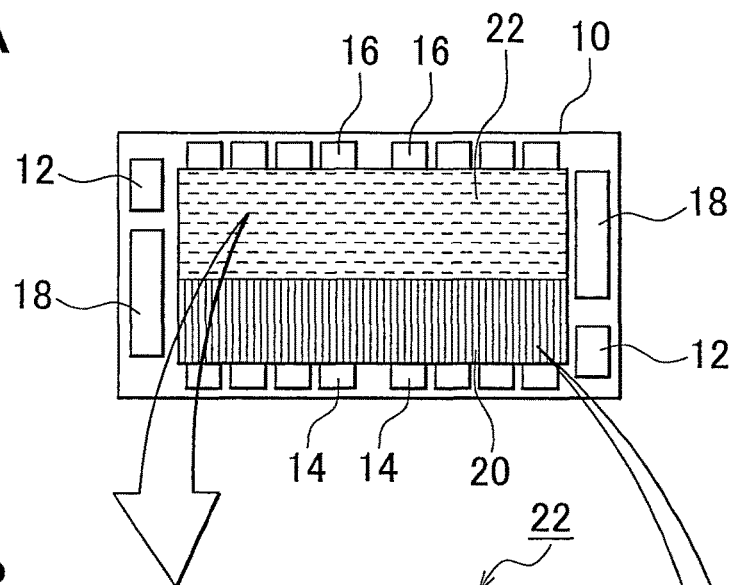
FIGS. 1A to 1C are plan views of a cell according to a first example embodiment of the invention.

Hereinafter, example embodiments of the invention will be described with reference to the drawings. However, the foregoing example embodiments are merely examples. The invention is not limited to these example embodiments.

A polymer electrolyte fuel cell in the example embodiments is a stacked structure in which a plurality of single cells are stacked, similar to a typical fuel cell. Each cell has a gas diffusion layer, a gas flow path, and a separator each arranged on both sides of a membrane electrode assembly (MEA), and the gas flow path of the cathode side is formed by a madreporic body made of expanded metal.

Typical expanded metal is formed into mesh by shearing a flat plate with upper and lower blades while the flat plate is advanced. Adjacent meshes in the feeding direction of the flat plate are alternately arranged, such that there are openings that communicate gas that flows on the gas diffusion layer side with gas that flows on the separator side. Therefore, on the gas upstream side, there is a relatively large amount of gas, so a large amount of produced water produced by a power generation reaction is carried away. As a result, the gas upstream side tends to become dry when gas is supplied in a non-humidified state, particularly during operation at high temperatures.

In this way, the gas flowrate on the gas upstream side is relatively large, so the amount of produced water that is carried away becomes large, resulting in the gas upstream side becoming dry. One way to inhibit or eliminate this is to reduce the gas flowrate on the gas upstream side.

However, simply reducing the gas flowrate will lead to a decrease in output voltage due to a lack of oxygen, especially on the gas downstream side and at normal temperatures.

Therefore, in these example embodiments, the opening amount of the expanded metal is changed so that it is different on the gas upstream side than it is the gas downstream side, with the opening amount on the gas upstream side being relatively small and the opening amount on the gas downstream side being relatively large. By making the opening amount on the gas upstream side relatively small, the gas that flows on the gas diffusion layer side is separated from the gas that flows on the separator side, such that the gas that flows on the gas diffusion layer side substantially decreases, and as a result, produced water on the gas upstream side can be inhibited from being carried away. That is, the overall flowrate of gas supplied to the gas flow path does not change, but on the gas upstream side the flowrate of gas that flows on the gas diffusion layer side is reduced, so less produced water is carried away. Therefore, drying of the gas upstream side is able to be inhibited or prevented, and the distribution of electric power generation at high temperatures in particular is able to be evened out. Also, making the opening amount on the gas downstream side relatively large enables the gas that flows on the gas diffusion layer side to be communicated with the gas that flows on the separator side, so a decrease in output voltage due to a lack of oxygen can be inhibited.

The opening amount of the expanded metal that forms the gas flow path in these example embodiments is different on the gas upstream side than it is on the gas downstream side, as described above. The opening amount may be changed in a continuous manner, or in a non-continuous or stepped manner, along the gas downstream side from the gas upstream side.

When changing the opening amount in a non-continuous or stepped manner, considering simplification of the cell structure and ease of manufacturing, the opening amount may be changed in approximately two or three steps. For example, when changing the opening amount in two steps, the opening amount of the expanded metal on the gas upstream side is set to a constant value S1, and the opening amount of the expanded metal on the gas downstream side is set to a constant value S2, with S1 being less than S2 (i.e., S1<S2).

One example of the opening amount S1 is zero, i.e., S1=0. This means that the gas that flows on the gas diffusion layer side is completely separated from the gas that flows on the separator side.

In these example embodiments, the basic principle is to reduce the amount of produced water that is carried away, by reducing the gas flowrate on the gas upstream side relative to the gas flowrate on the gas downstream side. Therefore, the opening amount on the gas upstream side can be set appropriately within the scope of this basic principle.

First Example Embodiment

FIG. 1A is a plan view of a cell 10 according to a first example embodiment. An anode manifold 12 is formed on right and left end portions of a separator that forms part of the cell 10, and hydrogen gas is supplied thereto as a fuel gas. Also, a cathode manifold is formed on upper and lower end portions of the separator that forms part of the cell 10. In the drawing, the cathode manifold is shown as a cathode manifold inlet 14 and a cathode manifold outlet 16. Air as the oxidizing gas is supplied from the cathode manifold inlet 14 on the lower portion in the drawing, and is discharged from the cathode manifold outlet 16 on the upper portion in the drawing. That is, hydrogen gas as the fuel gas flows in the cross direction in the drawing, and air as the oxidizing gas flows in the vertical direction that is perpendicular to the flow of the hydrogen gas. Also, a coolant manifold 18 is formed on left and right end portions of the separator, and coolant is supplied thereto.

Meanwhile, expanded metal that forms the gas flow path on the cathode side is not a single structure, but is formed by two portions, i.e., a first expanded metal 20 formed on the cathode manifold inlet 14 side, and another second expanded metal 22. The first expanded metal 20 and the second expanded metal 22 are each formed into hexagonal mesh, with one mesh having a different arrangement than the other mesh.

Figure 1B:
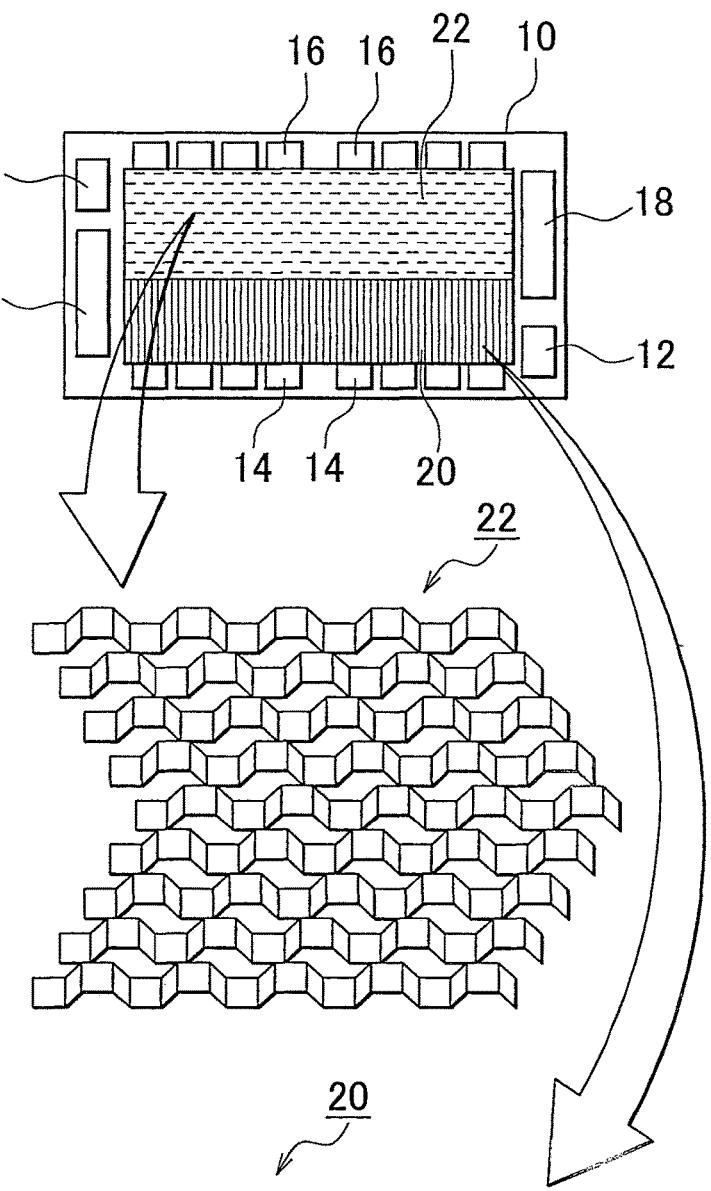

FIG. 1B is a view of the structure of the second expanded metal 22. The second expanded metal 22 forms a continuous structure in which hexagonal mesh is alternately arranged, similar to a typical fuel cell.

Figure 1C:
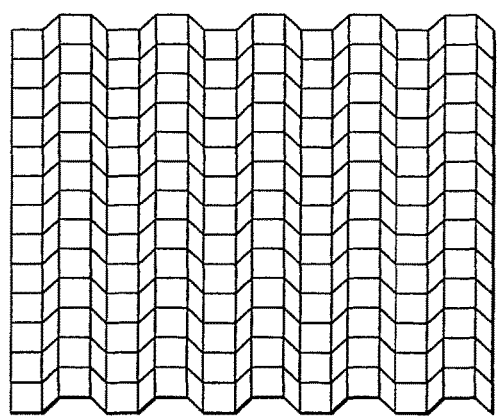

FIG. 1C is a view of the structure of the first expanded metal 20. In contrast to the second expanded metal 22, the first expanded metal 20 is such that the hexagonal mesh is aligned.

Figure 2A:
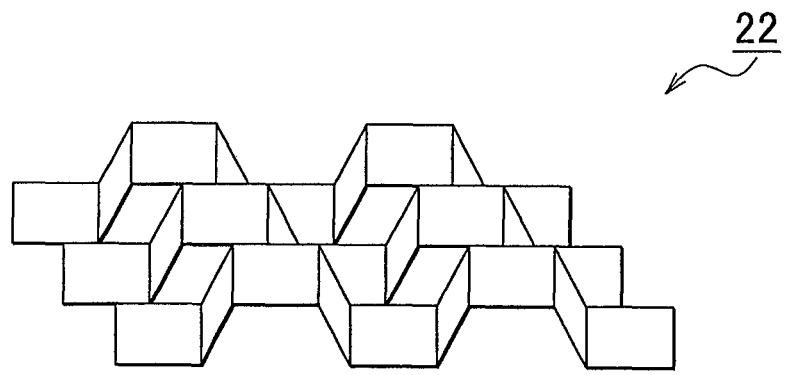
FIGS. 2A and 2B are block diagrams of a second expanded metal.
Figure 2B:
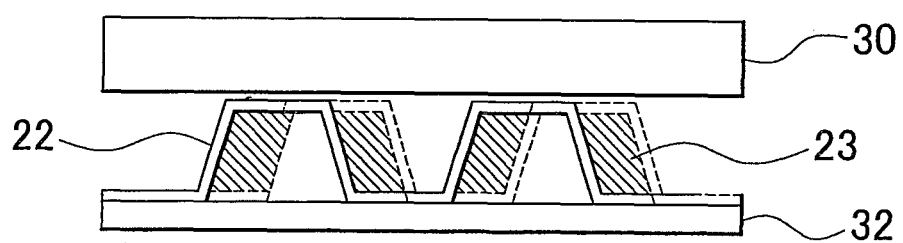

FIG. 2A is a partial enlarged view of the second expanded metal 22. Also, FIG. 2B is a sectional view showing a state in which the second expanded metal 22 is arranged between a gas diffusion layer 30 and a separator 32. In FIG. 2B, air as the oxidizing gas flows in a direction perpendicular to the surface of the paper on which FIG. 2B is drawn. With the second expanded metal 22, the mesh is alternately arranged, so gas is communicated at the shaded portion 23 in FIG. 2B. That is, gas on the gas diffusion layer 30 side flows to the separator 32 side through this shaded portion 23, and gas on the separator 32 side flows to the gas diffusion layer 30 side through the shaded portion 23. The shaded portion 23 corresponds to the opening in this example embodiment.

Figure 3A:
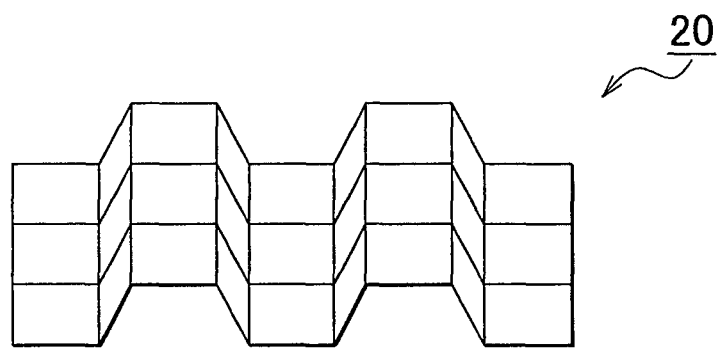
FIGS. 3A and 3B are block diagrams of a first expanded metal.
Figure 3B:
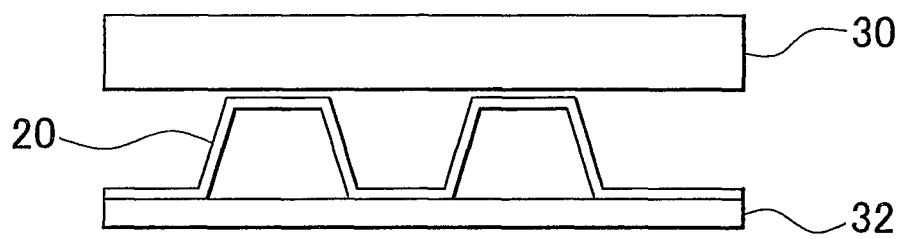

Also, FIG. 3A is a partial enlarged view of the first expanded metal 20. and FIG. 3B is a sectional view showing a state in which the first expanded metal 20 is arranged between the gas diffusion layer 30 and the separator 32. In FIG. 3B, air as the oxidizing gas flows in a direction perpendicular to the surface of the paper on which FIG. 3B is drawn. With the first expanded metal 20, the mesh is arranged in a straight line, so the gas flow paths are separated. That is, gas on the gas diffusion layer 30 side continues to flow on the gas diffusion layer 30 side, and gas on the separator 32 side continues to flow on the separator 32 side, without there being communication between the gases like that at the shaded portion 23 of the second expanded metal 22.

Therefore, the first expanded metal 20 is arranged on the cathode manifold inlet 14 side. If the second expanded metal 22 is arranged at a location other than this, the gases would flow in a separated state on the gas diffusion layer 30 side and the separator 32 side in the region where the first expanded metal 20 is arranged, and flow alternately in the region where the second expanded metal 22 is arranged, with the gasses flowing on the gas diffusion layer 30 side and the separator 32 side while being communicated.

On the cathode manifold inlet 14 side, gas flows separated to the gas diffusion layer 30 side and the separator 32 side by the first expanded metal 20, so on the cathode-side gas inlet side, the flowrate of gas that flows to the gas diffusion layer 30 side decreases by essentially half. Therefore, the amount of produced water that is carried away because of the gas flowrate on the cathode-side gas inlet side being relatively large is able to be reduced. On the other hand, on the cathode-side gas outlet side, the gas on the gas diffusion layer 30 side is able to be communicated with the gas on the separator 32 side by the second expanded metal 22, so a decrease in output voltage due to concentration overpotential can be inhibited.

Figure 5:
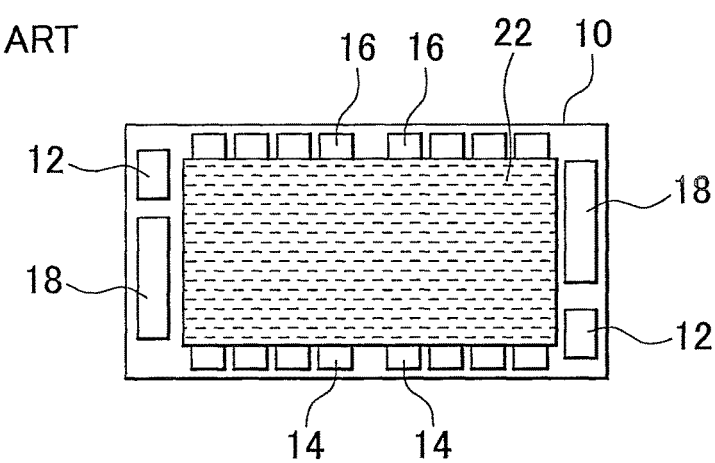
FIG. 5 is a plan view of a typical cell.

For comparison with the example embodiment, FIG. 5 is a view of a typical cell structure. Similar to the example embodiment, the cell 10 has an anode manifold 12 and a coolant manifold 18, and a cathode manifold outlet 16 is formed on the upper end and a cathode manifold inlet 14 is formed on the lower end. Meanwhile, in the typical cell structure, the gas flow path is formed by only one expanded metal, i.e., by only the second expanded metal 22 of the example embodiment.

Figure 4:
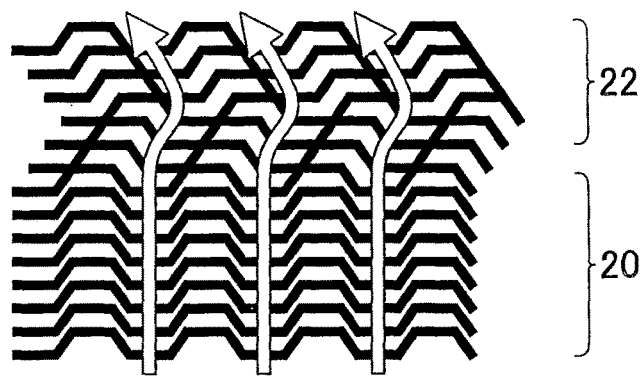
FIG. 4 is a view showing the flow of gas according to the first example embodiment.
Figure 6:
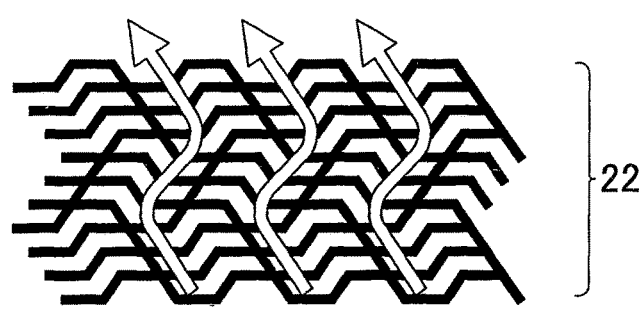
FIG. 6 is a view showing the flow of gas in a typical cell.

Therefore, as shown in FIG. 6, the gas that has flowed in from the cathode manifold inlet 14 flows alternately, and the gas on the gas diffusion side and the gas on the separator side are communicated with each other such that gas exchange occurs. At the cathode-side gas inlet, the gas flowrate is relatively large, so the amount of produced water that is carried away is large, and as a result, the cathode-side gas inlet tends to become dry. In particular, when supplying gas at high temperatures or with no humidification, this tendency becomes remarkable. The difference in the gas flow of this example embodiment and typical technology is evident by comparing FIGS. 4 and 6.

In this example embodiment, the gas flow path is formed by the first expanded metal 20 and the second expanded metal 22, as shown in FIGS. 1A to 1C. The percentage of the region that is occupied by the first expanded metal 20, or the length, in the direction along the gas flow path, of the region may be set from the output voltage characteristic to be in an optimum range.

That is, if the region of the first expanded metal 20 is too small, there is not much difference from a typical cell structure in which the gas flow path is formed by only the second expanded metal 22, so not much effect in preventing drying at the cathode-side gas inlet can be expected. That is, a decrease in output voltage at high temperatures is unable to be prevented. On the other hand, if the region of the first expanded metal 20 is too large, the percentage of gas communication between the gas on the gas diffusion layer side and the gas on the separator side becomes small, so the gas flowrate becomes small, and as a result, the output may decrease due to concentration overpotential at normal temperatures.

In this way, there is generally a tradeoff between the output voltage characteristic at high temperatures and the output voltage characteristic at normal temperatures. Therefore, the percentage of the region of the first expanded metal 20, or the length in the direction along the gas flow path, is set, taking into account the output voltage at high temperatures and the output voltage at normal temperatures, within a region that enables a balance between the two to be achieved.

Figure 7:
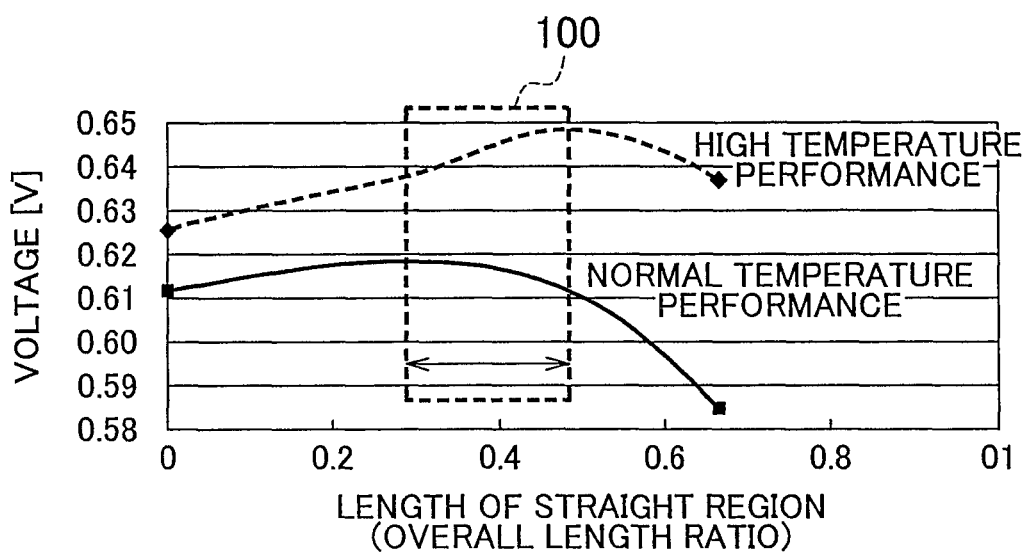
FIG. 7 is a graph showing the relationship between an output voltage characteristic and the percentage of a first expanded metal region according to the first example embodiment.

FIG. 7 is a view showing the output voltage characteristics at high temperatures and at normal temperatures, when the length, in the direction along the gas flow path, of the region of the first expanded metal 20 (this region will be referred to as the "straight region" because in the drawings the mesh is arranged in a straight line) is changed. In the drawing, the horizontal axis represents the ratio of the length of the region of the first expanded metal 20 when the entire length of the gas flow path is designated 1. Also, the vertical axis represents the output voltage (V). Also in the drawing, the solid line indicates normal temperature performance and the broken line indicates high temperature performance.

Looking at high temperature performance, if the ratio is increased, the output voltage increases. The output voltage peaks when the ratio is close to 0.5, after which if the ratio is increased, the output voltage tends to conversely decrease. On the other hand, looking at normal temperature performance, if the ratio is increased, the output voltage remains almost constant or increases slightly. The output voltage is greatest when the ratio is close to 0.3, after which if the ratio is increases, the output voltage tends to conversely decrease. The decrease in the output voltage when the ratio exceeds 0.5 is more significant at normal temperatures than at high temperatures. The reason for this is thought to be concentration overpotential.

From FIG. 7, it is evident that in a range in which the ratio is less than 1/3, the high temperature performance increases, but not really sufficiently, and ensuring a sufficient value for the output voltage as well is difficult. Also, in a range in which the ratio is greater than 1/2, the output voltage at high temperatures is sufficient, but the output voltage at normal temperatures ends up decreasing significantly.

Therefore, the ratio of the region of the first expanded metal 20 with respect to the entire gas flow path is set to within a range of 1/3 to 1/2, inclusive, which enables sufficient output voltage to be ensured both at normal temperatures and at high temperatures.

Second Example Embodiment

In the first example embodiment described above, the first expanded metal 20 is arranged near the cathode manifold inlet 14, but a third expanded metal may also be arranged instead of the first expanded metal 20.

Figure 8:
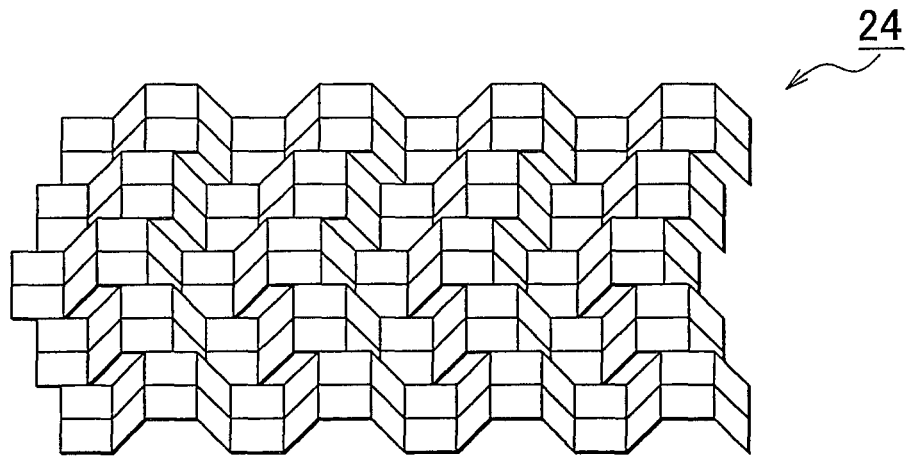
FIG. 8 is a block diagram of expanded metal according to a second example embodiment of the invention.

FIG. 8 is a view of a third expanded metal 24 that is used instead of the first expanded metal 20. With this third expanded metal 24, the mesh is not arranged in a straight line as it is with the first expanded metal 20. Instead, two adjacent strands of mesh (two adjacent meshes) in the feeding direction are arranged as a pair in a straight line, and pairs of strands are alternately arranged. With the expanded metal, mesh is formed by making slits one strand at a time in a flat plate member using a mold while the flat plate member is advanced, as described above. However, the third expanded metal 24 is formed by repeating a process that involves fixing the position of an upper blade, making consecutive slits for two strands, then oscillating the upper blade in a direction perpendicular to the feeding direction and again making consecutive slits for two strands.

In this way, the third expanded metal 24 is such that slits for two adjacent strands (two adjacent meshes) are arranged in a straight line, so at this portion, the gas on the gas diffusion layer side is separated from the gas on the separator side so gas exchange will not occur. As a result, the gas flowrate substantially decreases, thus making it possible to inhibit the gas inlet side from becoming dry at high temperatures, similar to the first expanded metal 20. Also, when looking at the contact rate or contact area with the gas diffusion layer, the contact rate or contact area increases with the third expanded metal 24 compared with the second expanded metal 22, so evaporation of the produced water from the gas diffusion layer can also be inhibited.

The third expanded metal 24 is a structure in which slits for two strands are arranged in a straight line, so the feed rate is able to be increased to twice that of a typical structure.

Third Example Embodiment

In the first example embodiment, the first expanded metal 20 is arranged near the cathode manifold inlet 14, but in the region of the first expanded metal 20, the gas flows linearly, so there may be an area where gas does not easily flow, depending on the position where the cathode manifold inlet 14 is formed.

Figure 9:
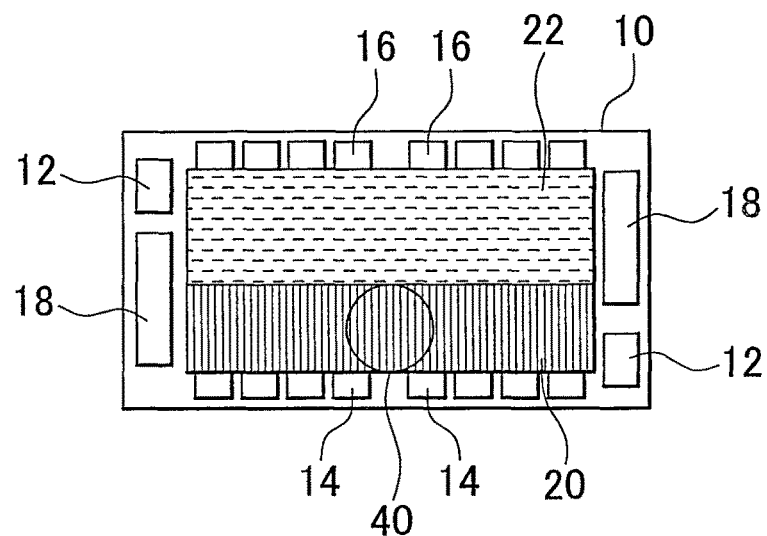
FIG. 9 is a view showing a region where there is a decrease in the electric power generating efficiency of the first expanded metal according to the first example embodiment.

For example, as shown in FIG. 9, in the first example embodiment, when a plurality of cathode manifold inlets 14 are formed on the lower end of the separator, and the interval between the cathode manifold inlets 14 is relatively larger in the center portion than it is at other portions, because gas that has flowed into the cathode manifold inlets 14 flows linearly through the first expanded metal 20, gas does not flow as easily at the center portion where there is no cathode manifold inlet 14, i.e., at the region 40 in the drawing, and thus electric power generating performance may be low at this portion.

Figure 10:
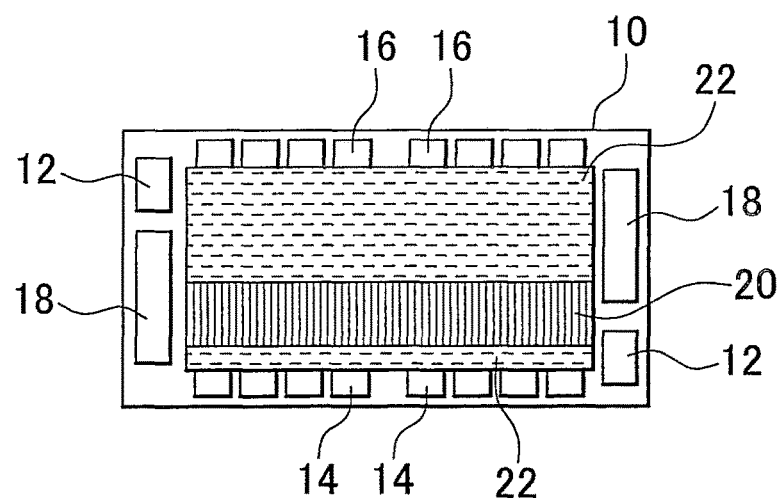
FIG. 10 is a plan view of a cell according to a third example embodiment of the invention.

Therefore, as shown in FIG. 10, a diffusion member for diffusing gas that has flowed in from the cathode manifold inlets 14 may be formed between the first expanded metal 20 and the cathode manifold inlets 14. More specifically, the second expanded metal 22 may be arranged between the first expanded metal 20 and the cathode manifold inlets 14. At the second expanded metal 22, the gases flow alternately, so the gas that has flowed in from the cathode manifold inlet 14 will also flow into the region 40. The second expanded metal 22 that is between the first expanded metal 20 and the cathode manifold inlets 14 may be arranged on a non-electric power generating surface, i.e., in a region where there is no membrane electrode assembly (MEA).

The diffusion member that is arranged between the first expanded metal 20 and the cathode manifold inlets 14 may be something other than the second expanded metal 22. For example, a sintered madreporic body or a diffusion layer may be arranged, or dimples may be formed on the separator side.

Fourth Example Embodiment

Figure 11:
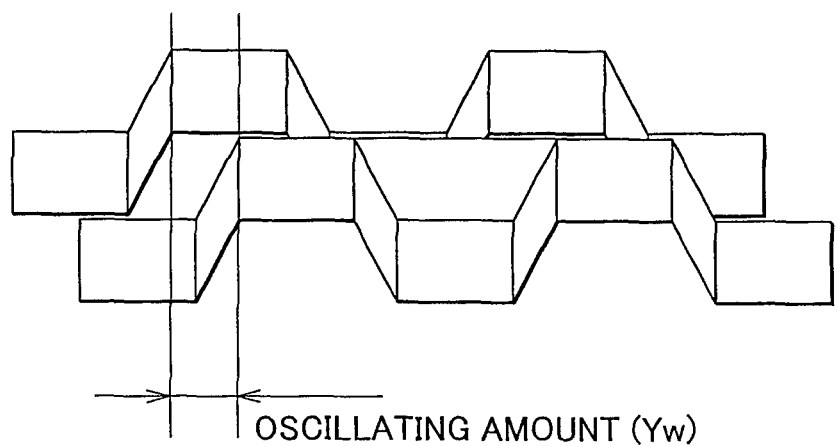
FIG. 11 is a view showing the oscillating amount of a fourth expanded metal.
Figure 12:
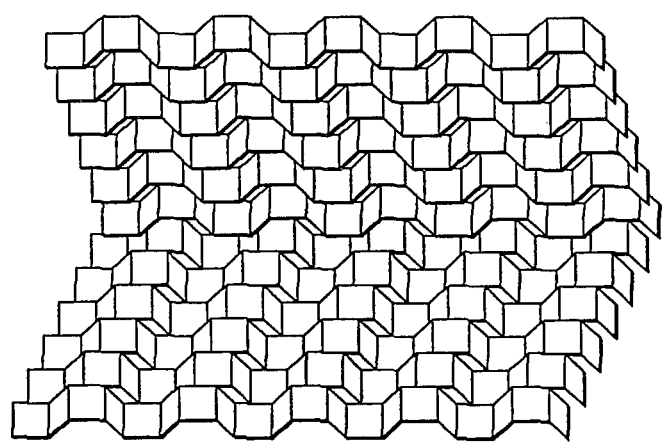
FIG. 12 is a block diagram of the fourth expanded metal according to a fourth example embodiment of the invention.

For example, the foregoing first to the third example embodiments describe the first expanded metal 20 in which mesh such as that shown in FIG. 1 is arranged in a straight line, and the third expanded metal 24 in which two strands of mesh are arranged as a pair in a straight line, as shown in FIG. 8. However, as shown in FIG. 11, when the offset in the position where the mesh is formed is designated an oscillating amount Yw, expanded metal in which this oscillating amount Yw has been changed various ways may be arranged near the cathode manifold inlet 14. In this case, the first expanded metal 20 is equivalent to a case in which the oscillating amount Yw is 0, and the second expanded metal 22 is equivalent to a case in which the oscillating amount is the maximum or a value close thereto. For example, when one wavelength of expanded metal is 0.8 mm, the maximum value of the oscillating amount is 0.4 mm, and in this case, the mesh, i.e., the openings, is in its most offset state. With the second expanded metal 22, the oscillating amount may not only be the maximum 0.4 mm, but also 0.2 mm that is smaller than this. Also, instead of the first expanded metal 20, the oscillating amount Yw may be a value near 0, such as 0.05 mm or 0.1 mm. FIG. 12 is a view of the structure of a fourth expanded metal when the oscillating amount Yw is 0.1 mm, which is between the oscillating amount (0 mm) of the first expanded metal 20 and the oscillating amount (0.2 mm) of the second expanded metal 22. This fourth expanded metal displays properties between those of the first expanded metal 20 and the second expanded metal 22.

Figure 13:
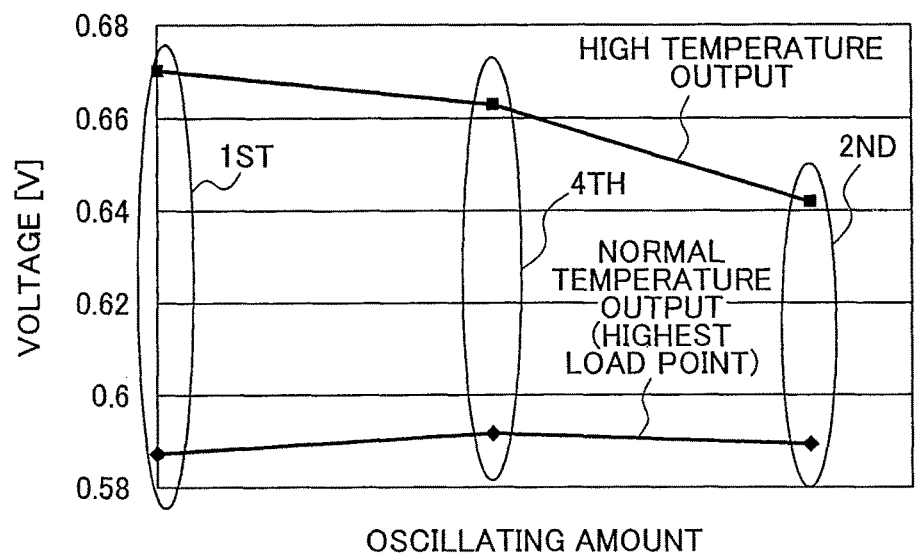
FIG. 13 is a graph showing the relationship between the output voltage characteristic and a change in the oscillating amount.

FIG. 13 is a view of the output voltage characteristics when the first expanded metal 20 (denoted by "1ST" in the drawing) is used, when the fourth expanded metal (denoted by "4TH" in the drawing) shown in FIG. 12 is used instead of the first expanded metal 20, and when the second expanded metal 22 (denoted by "2ND" in the drawing) is used. The fourth expanded metal displays a normal temperature characteristic and a high temperature characteristic, and has properties substantially between those of the first expanded metal 20 and the second expanded metal 22. Therefore, the fourth expanded metal may be used instead of the first expanded metal 20, when output voltage approximately that of the first expanded metal 20 is not required, with the high temperature characteristic.

In the first to the fourth example embodiments, a different expanded metal may be used on the upstream side of the cathode-side gas than is used on the downstream side of the cathode-side gas. On the gas upstream side, expanded metal in which the oscillating amount of the mesh is relatively small compared with that on the downstream side may be used. The oscillating amount of the mesh is proportional to the gas opening amount that communicates the gas diffusion layer side with the separator side. Therefore, the gas opening amount can be made relatively smaller on the gas upstream side than on the downstream side. However, in the manufacturing process of the expanded metal, gradually changing the oscillating amount of the mesh is relatively troublesome, and high output voltage is able to be obtained, so a combination of a zero oscillating amount, i.e., the first expanded metal 20, and an oscillating amount of a predetermined value, i.e., the second expanded metal 22, is possible.

<Manufacturing Method of the Expanded Metal According to the First to the Fourth Example Embodiments>

Figure 14:
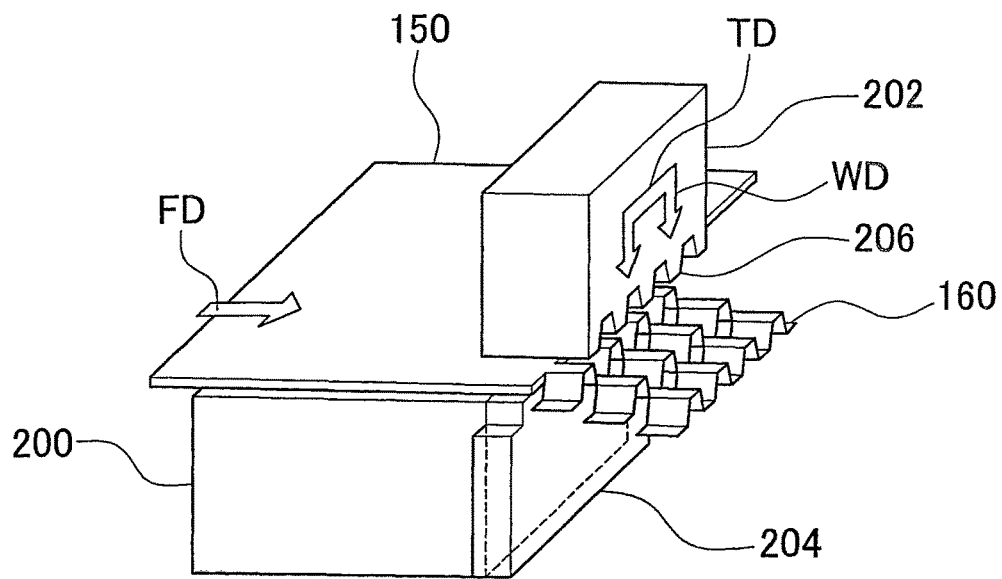
FIG. 14 is a block diagram of a manufacturing apparatus according to the first to the fourth example embodiments.

FIG. 14 is a block diagram of an example of an apparatus for manufacturing the first expanded metal 20 and the second expanded metal 22 according to the first to the fourth example embodiments. The manufacturing apparatus includes a mold that includes a die 200, an upper blade 202, and a lower blade 204, and a roller that feeds a flat plate member 150 in a FD direction. The upper blade 202 is able to oscillate in a TD direction that is orthogonal to the FD direction, and raises and lowers in a WD direction that is a vertical direction. Trapezoidal-shaped protrusions 206 are formed at regular intervals in the TD direction on a lower surface of the upper blade 202.

The flat plate member 150 is fed (i.e., advanced) into the mold at a predetermined feed rate by the roller, partially sheared by the trapezoidal-shaped protrusions 206 and the die 200, and sandwiched by the upper blade 202 and the lower blade 204, such that trapezoidal-shaped raised tabs are formed. At this time, lath cut metal 160 that will become the first expanded metal 20 is formed by setting the oscillating amount in the TD direction to zero, and the lath cut metal 160 that will become the second expanded metal 22 is formed by oscillating the upper blade 202 a predetermined amount in the TD direction each time the upper blade 202 is raised. The lath cut metal 160 that will become the expanded metal 24 shown in FIG. 8 is formed by oscillating the upper blade 202 a predetermined amount in the TD direction not every time the upper blade 202 is raised, but rather at a ratio of once every two times the upper blade 202 is raised. In this way, the first expanded metal 20 and the second expanded metal 22 are manufactured by first forming the lath cut metal 160 that has stepped-shape mesh, and then rolling it with a pressure roller. The first expanded metal 20 and the second expanded metal 22 can be continuously manufactured by changing the oscillating amount in a stepped fashion. This means that a fuel cell having the cell shown in FIG. 1 is able to be efficiently manufactured.

With the first expanded metal 20, the oscillating amount is zero, but it does not always have to be zero in the strictest sense. That is, a case in which the oscillating amount is substantially zero, i.e., a case in which there is a very small oscillating amount that is within the tolerance range, is also included within the range of the first expanded metal 20.

Also, in this example embodiment, the gas flow path on the cathode side is formed by expanded metal, but the gas flow path on the anode side may be formed by either a groove or expanded metal. That is, the invention may be applied to a suitable fuel cell in which at least the gas flow path on the cathode side is formed by expanded metal.

The invention claimed is:

1. A fuel cell comprising: a gas diffusion layer;
   a separator having left and right end portions, and upper and lower end portions; and an oxidizing gas flow path that is arranged vertically between the gas diffusion layer and the separator so that oxidizing gas flows in a vertical direction, and that is formed from expanded metal, wherein the expanded metal includes meshes;

the expanded metal includes an upstream first expanded metal that does not have an opening that is formed by a mesh of the meshes, such that the oxidizing gas that flows on the gas diffusion layer side does not communicate with oxidizing gas that flows on the separator side, and a downstream second expanded metal that has an opening that communicates oxidizing gas that flows on the gas diffusion layer side with oxidizing gas that flows on the separator side;

the first expanded metal is expanded metal in which adjacent meshes are arranged in the straight line in view of a flow direction of the oxidizing gas; and the second expanded metal is expanded metal in which adjacent meshes are staggered in view of a flow direction of the oxidizing gas.

2. The fuel cell according to claim 1, wherein a ratio of the first expanded metal to the oxidizing gas flow path is no less than 1/3 and no more than 1/2.

3. The fuel cell according to claim 2, wherein the ratio of the first expanded metal to the oxidizing gas flow path is substantially 0.3.

4. The fuel cell according to claim 1, further comprising: a cathode manifold that supplies oxidizing gas to the oxidizing gas flow path; and a gas diffusion member that is arranged between the cathode manifold and the first expanded metal, that diffuses oxidizing gas from the cathode manifold, and that causes the diffused oxidizing gas to flow into the first expanded metal.

5. The fuel cell according to claim 4, wherein the gas diffusion member is formed from expanded metal that is similar to the second expanded metal.

6. The fuel cell according to claim 4, wherein the gas diffusion member is formed by arranging the second expanded metal between the first expanded metal and the cathode manifold.

7. The fuel cell according to claim 1, wherein a ratio of the first expanded metal to the oxidizing gas flow path is no less than 1/3 and no more than 1/2.

8. The fuel cell according to claim 7, wherein the ratio of the first expanded metal to the oxidizing gas flow path is substantially 0.3.

9. The fuel cell according to claim 1, further comprising:
a cathode manifold that supplies oxidizing gas to the oxidizing path; and
a gas diffusion member that is arranged between the cathode manifold and the first expanded metal, that diffuses oxidizing gas from the cathode manifold, and that causes the diffused oxidizing gas to flow into the first expanded metal.

10. The fuel cell according to claim 9, wherein the gas diffusion member is formed from expanded metal that is similar to the second expanded metal.

11. The fuel cell according claim 9, wherein the gas diffusion member is formed by arranging the second expanded metal between the first expanded metal and the cathode manifold.

* * * * *